US011463554B2

(12) United States Patent
Chaysinh et al.

(10) Patent No.: US 11,463,554 B2
(45) Date of Patent: Oct. 4, 2022

(54) SYSTEMS AND METHODS FOR DYNAMIC MULTI-ACCESS EDGE ALLOCATION USING ARTIFICIAL INTELLIGENCE

(71) Applicant: Verizon Patent and Licensing Inc., Arlington, VA (US)

(72) Inventors: Stephane Chaysinh, Basking Ridge, NJ (US); John A. Turato, Garden City South, NY (US); Rohit Shirish Saraf, Nashua, NH (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 119 days.

(21) Appl. No.: 16/718,676

(22) Filed: Dec. 18, 2019

(65) Prior Publication Data

US 2021/0194988 A1 Jun. 24, 2021

(51) Int. Cl.
| | |
|---|---|
| *H04L 67/61* | (2022.01) |
| *G06N 20/00* | (2019.01) |
| *G06N 5/04* | (2006.01) |
| *H04L 41/50* | (2022.01) |
| *H04L 47/70* | (2022.01) |
| *H04L 67/10* | (2022.01) |
| *H04L 67/52* | (2022.01) |
| *H04L 67/62* | (2022.01) |

(52) U.S. Cl.
CPC ............ *H04L 67/61* (2022.05); *G06N 5/04* (2013.01); *G06N 20/00* (2019.01); *H04L 41/50* (2013.01); *H04L 47/82* (2013.01); *H04L 67/10* (2013.01); *H04L 67/52* (2022.05); *H04L 67/62* (2022.05)

(58) Field of Classification Search
CPC ....... H04L 67/322; H04L 41/50; H04L 47/82; H04L 67/10; H04L 67/18; H04L 67/325; G06N 20/00; G06N 5/04
USPC ......................................................... 709/219
See application file for complete search history.

(56) References Cited

U.S. PATENT DOCUMENTS

| | | | |
|---|---|---|---|
| 2009/0183218 A1* | 7/2009 | Li | H04N 21/254 725/114 |
| 2014/0140213 A1* | 5/2014 | Raleigh | H04L 65/601 370/235 |
| 2019/0116128 A1* | 4/2019 | Guo | H04L 67/101 |
| 2019/0379592 A1* | 12/2019 | Samadi | H04L 43/14 |

* cited by examiner

*Primary Examiner* — Kevin S Mai

(57) ABSTRACT

Provided are systems and methods that use artificial intelligence and/or machine learning to dynamically allocate services at different times and at different network edge locations within a Multi-Access Edge ("MEC") enhanced network based on a multitude of factors that change the priorities of the services at the different times and at the different edge locations. For instance, a MEC controller, controlling the allocation of resources at a particular edge location, may modify the allocation of services at that particular edge location at different times based on time and/or location sensitive events that occur at different times and that relate to different services, changing usage patterns that are derived from prior service utilization, and/or categorization of the services as permanent, time insensitive, or other categories of services with permissions to execute at different times from different edge locations.

19 Claims, 9 Drawing Sheets

SYSTEMS AND METHODS FOR DYNAMIC MULTI-ACCESS EDGE ALLOCATION USING ARTIFICIAL INTELLIGENCE

BACKGROUND

Latency may indicate the time to request and receive services from a data network. Multi-Access Edge Computing ("MEC") may refer to a network architecture for reducing latency, enhanced processing, reduced backhaul, etc. by providing the requested services from network edge locations that are closer to different subsets of users than from a more distant core network or external data network. Infrastructure considerations may limit the amount of resources that can be deployed to each network edge location, which may reduce the number of services that may be available from each network edge location at any given time. As a result, the performance advantage offered by the network edge locations may be minimized or altogether eliminated if the services are not available at the requested network edge locations at the time of request, and instead have to be retrieved from the core network or the external data network.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may dynamically allocate services at different times and at different network edge locations within a Multi-Access Edge ("MEC") enhanced network based on changing service usage patterns that may be determined using artificial intelligence, machine learning, and/or other suitable techniques. The artificial intelligence and/or machine learning may be used to prioritize the services that will be, and/or are predicted to be, in highest demand at the different times and at the different locations. Based on the service prioritization, each network edge location may increase service availability at the time of a request, may maximize the number of requests that result in service "hits" (e.g., services that are running and/or executing at an edge location prior to a request being made for those services), may decrease service thrashing (e.g., removal of unused services from an edge location to free resources for newly requested services), and/or may decrease overall latency associated with service access from the network edge locations relative to a core network or an external data network that is accessed via the core network.

Figure 1:
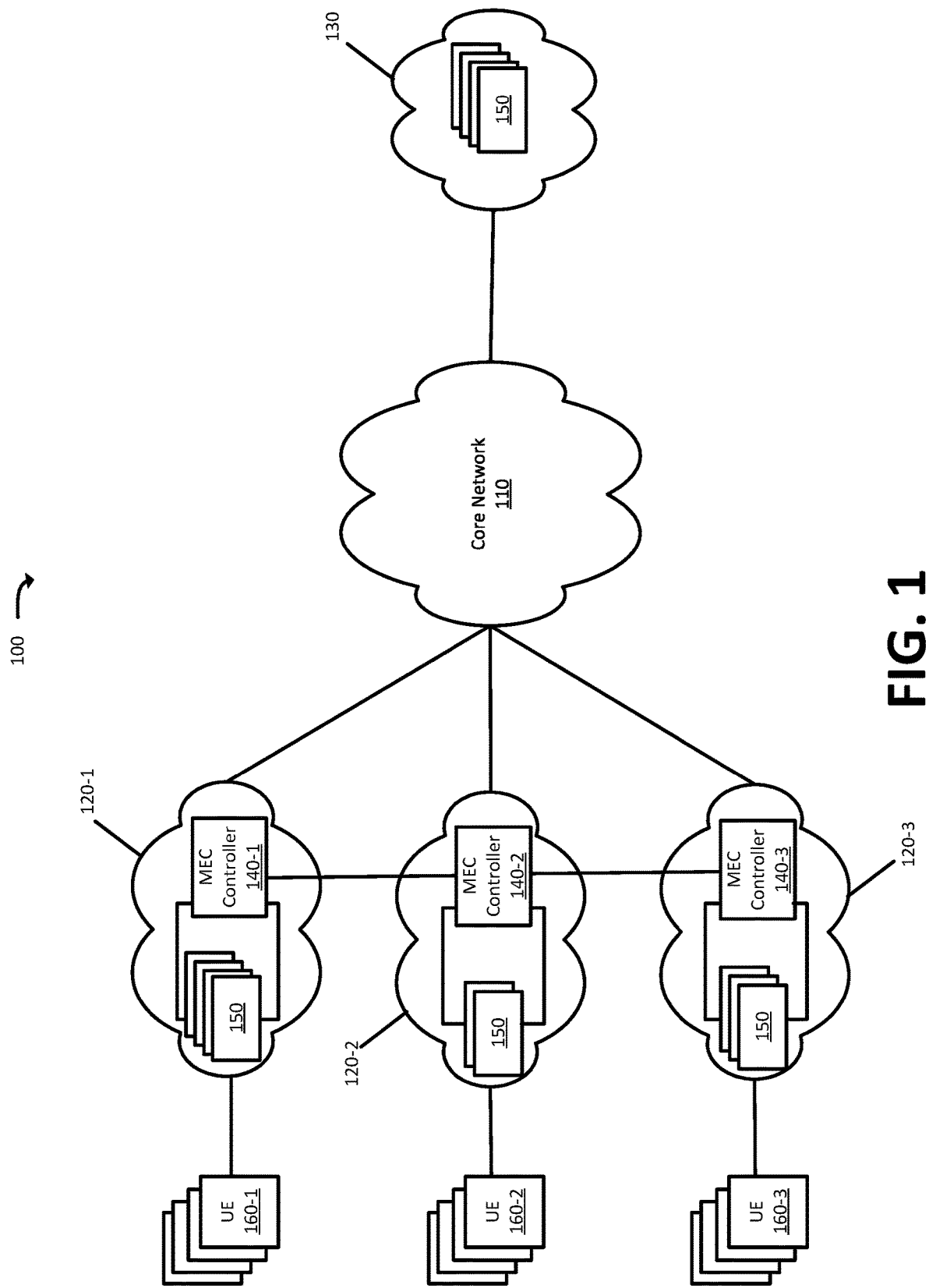
FIG. 1 illustrates an example environment for a Multi-Access Edge Computing ("MEC") enhanced network, in which one or more embodiments may be implemented.

FIG. 1 illustrates an example environment 100 for a MEC enhanced network, in which one or more embodiments may be implemented. Environment 100 may include core network 110 and network edge locations 120-1, 120-2, and 120-3 (herein sometimes collectively referred to as "edge locations 120" or individually as "edge location 120").

In some embodiments, environment 100 may correspond to a Fifth Generation ("5G") network, and/or may include elements of a 5G network. In some embodiments, environment 100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of core network 110 may be implemented by, may be communicatively coupled with, and/or may include elements of a 5G core network and/or another type of core network (e.g., an evolved packet core ("EPC")). Alternatively, environment 100 may correspond to a content delivery network ("CDN") or other distributed platform that provides tiered access to different content, services, and/or data.

In some embodiments, core network 110 may include elements that provide control signaling and data connectivity services to user equipment ("UEs") 160 that are communicatively coupled to different radio access networks ("RANs") or service regions of MEC enhanced network 100. For instance, core network 110 may include one or more gateways, interfaces, functions, etc., (e.g., a User Plane Function ("UPF")) that facilitate the transmission of traffic between RANs and external data network 130 and/or other elements (e.g., a Mobility Management Entity ("MME") and a Home Subscriber Server ("HSS")) for tracking UE mobility, subscriber information, access permissions, and/or other information relating to network access. External data network 130 may include resources that are outside the control of core network 110. For instance, external data network 130 may include a public cloud or third-party service providers that operate across the Internet.

In some embodiments, core network 110 may correspond to a central node or origin tier within a distributed platform that distributes services 150 to edge locations 120. Services 150 may be accessed with lower latency from edge locations 120 than from core network 110 and/or external data network 130 by different sets of UEs 160 that request and/or access services 150 from an edge location 120 that is in physical or geographical proximity to UEs 160 (e.g., closer than core network 110 and/or external data network 130). In some embodiments, core network 110 may include resources that can be used to execute or provide services 150 from within core network 110, or may include gateways or other devices for providing access to services 150 from external data network 130. Services 150 may include providing content, data, functions, voice services, applications, and/or other tasks that may be distributed from and/or executed at the network edge locations 120, core network 110, and/or external data network 130.

Edge locations 120 may be distributed across different geographic regions. In some embodiments, edge locations 120 may correspond to or may be collocated with the RANs of a telecommunications network. In some other embodiments, edge locations 120 may correspond to distributed Points-of-Presence ("PoPs") of a CDN or other distributed platform. The PoPs may be located near different network access points from which different sets of UEs 160 request and receive services.

Each edge location 120 may include a set of resources, that may be configured by a corresponding MEC controller 140, to provide various services 150 to UEs 160 whose requests are routed to that edge location 120. More specifically, MEC controller 140-1 may dynamically allocate, move, and/or manage services 150 that are available at and/or run from the set of resources of edge location 120-1, MEC controller 140-2 may allocate, move, and/or manage services 150 that are available at and/or run from the set of resources of edge location 120-2, and MEC controller 140-3 may allocate, move, and/or manage services 150 that are available at and/or run from the set of resources of edge location 120-3. MEC controllers 140 may obtain instances of each service 150 directly from a repository in core network 110, or from different service providers and/or one or more public clouds operating in external data network 130.

In some embodiments, instances of the services may be stored in containers, virtual machines, or the like. MEC controllers 140 and/or resources of edge locations 120 may implement an application programming interface ("API"), such as the Kubernetes API, and/or may otherwise include suitable functionality that enables MEC controllers 140 to configure the resources of edge locations. For example, such functionality may facilitate the installation, configuration, instantiation, etc., of containers (e.g., that implement services 150) on the resources of edge locations 120. Services 150 may include providing content (e.g., website access, media streaming, etc.), accessing data, executing code (e.g., functions, applications, scripts, commands, etc.), and/or performing other tasks.

The set of resources that provide access to services (e.g., resources of edge locations 120) 150 may include one or more servers or network devices with processor, memory, network, and/or other resources that can be configured to receive and respond to UE 160 requests, and to provide services 150 identified in the requests. In some embodiments, the resources of edge locations 120 may include virtualized, distributed, cloud, etc., resources, which may be logically considered as "nodes" (e.g., where a node represents a discrete set of hardware resources).

Each MEC controller 140 may be a device that operates within an edge location 120, or that is configured to run using the set of resources in that edge location 120. Each MEC controller 140 may receive public data and network data relating to services 150 that are requested from a corresponding edge location 120.

The public data may include event data (e.g., concerts, sporting events, attractions, etc.), location data, and/or other data with contextual, temporal, and/or geographical relevance to one or more of services 150. For instance, the event data may indicate the start of a concert, and services 150 may include providing a livestream of the concert to UEs 160. MEC controllers 140 may acquire the public data from third-party sources (e.g., external data network 130, UEs 160, the Internet, etc.).

The network data may also relate to one or more of services 150, but may be acquired from core network 110 and/or other edge locations 120. For instance, the network data may include service usage statistics (e.g., the number of requests for different services 150 at different edge locations 120), UE mobility data, UE connectivity data, billing data, demographic data, and/or other data that MEC controllers 140 may indirectly or directly collect from UEs 160, the usage of services 150, and/or elements in core network 110.

Each MEC controller 140 may use artificial intelligence and/or machine learning to classify and/or prioritize services 150 based on the public data and/or the network data. Each MEC controller 140 may then dynamically allocate different services 150 at different times to the set of resources at a corresponding edge location 120 based on the service 150 classification and prioritization.

In some embodiments, MEC controllers 140 may utilize artificial intelligence and/or machine learning techniques in lieu of using other types of classification and prioritization techniques (e.g., first-hit, second-hit, most frequently used ("MFU"), most recently used ("MRU"), round robin, or other similar service allocation schemes). In some embodiments, MEC controllers 140 may utilize artificial intelligence and/or machine learning techniques in addition to one or more of the service allocation schemes mentioned above.

MEC controllers 140 may use artificial intelligence and/or machine learning techniques to determine service request patterns, UE 160 behaviors, and/or other patterns, and to predict which services 150 will be most requested or most utilized at different edge locations 120 at different times. In this manner, MEC controllers 140 may maximize usage of the resources at each edge location 120 and may maximize performance across edge locations 120 while reducing the reallocation of services 150 and the number of requests for services 150 that are not allocated at edge locations 120. Further, the allocation of resources in accordance with embodiments described herein may improve utilization metrics associated with edge locations 120 (e.g., minimize the amount of unused resources that are provisioned for edge locations 120).

Each edge location 120 has a finite set of resources. The set of resources may limit the number of services 150 that can be simultaneously executed from each edge location 120 at any given point in time. Accordingly, MEC controllers 140 may shift one or more previously allocated services 150 to other edge locations 120, core network 110, or a public cloud operating in external data network 130 in order to free resources for a new set of services 150 that are being allocated based on predicted changes to service usage and resource utilization at a particular edge location 120. In some embodiments, MEC controllers 140 may also dynamically change the resources that are allocated to each service 150. For instance, MEC controllers 140 may dynamically increase or decrease the processing, memory, network, and/or other resources that can be used to execute each service 150 in response to changing service priority (e.g., changing service usage patterns, UE 160 behavior, etc.).

In some embodiments, MEC controllers 140 may control request distribution at a respective edge location 120. For instance, first set of UEs 160-1 may issue requests that route to edge location 120-1 (e.g., based on geographical locations associated with UEs 160-1 and edge location 120-1). MEC controller 140-1 may track which services 150 are running at edge location 120-1, other edge locations 120 (such as edge locations 120-2 and/or 120-3), core network 110, and/or external data network 130. MEC controller 140-1 may distribute a first subset of requests for services 150 running at edge location 120-1 to the servers or devices that execute those services 150, may distribute a second subset of requests, that are not allocated to edge location 120-1, to neighboring edge locations 120-2 and 120-3 where those services 150 are running, and may distribute other requests for services, that are not allocated at edge locations 120, to core network 110 and core network 110 may forward the requests to external data network 130 or to resources within core network 110 where those services 150 may be running.

UE 160 may include a computation and communication device, such as a wireless mobile communication device, that is capable of communicating with edge locations 120, core network 110, and/or external data network 130. UE 160 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet-of-Things ("IoT device") (e.g., a sensor, a smart home appliance, or the like), a wearable device, a Mobile-to-Mobile ("M2M") device, connected vehicle (e.g., a connected car or a connected drone), or another type of mobile computation and communication device. UE 160 may send traffic to and/or receive traffic (e.g., user plane traffic) from edge locations 120, core network 110, and/or external data network 130.

The quantity of devices, edge locations 120, and/or networks, illustrated in FIG. 1, is provided for explanatory purposes only. In practice, environment 100 may include additional devices, edge locations 120, and/or networks, fewer devices, edge locations 120, and/or networks, different devices, edge locations 120, and/or networks, or differently arranged devices, edge locations 120, and/or networks than illustrated in FIG. 1. For example, while not shown, core network 110 and edge locations 120 may include devices that facilitate or enable communication between various components shown in environment 100, such as routers, modems, gateways, switches, hubs, etc. Alternatively, or additionally, one or more of the devices of environment 100 may perform one or more functions described as being performed by another one or more of the devices of environment 100. Devices of environment 100 as well as core network 110, edge locations 120, external data network 130, and/or UEs 160 may interconnect with each other and/or other devices via wired connections, wireless connections, or a combination of wired and wireless connections. In some implementations, one or more devices of environment 100 may be physically integrated in, and/or may be physically attached to, one or more other devices of environment 100.

Figure 2A:
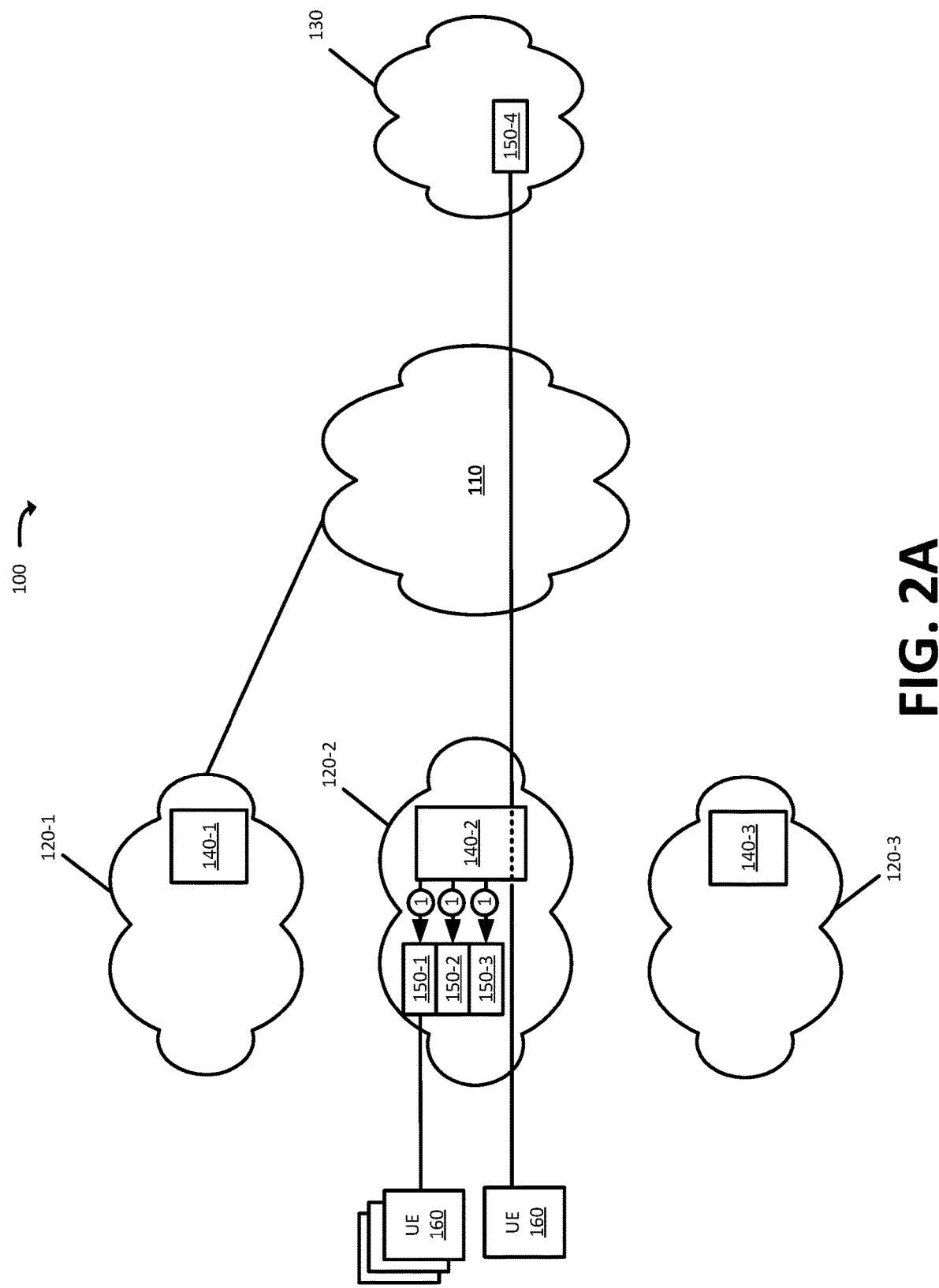
FIGS. 2A and 2B illustrate an example of dynamic service allocation at different edge locations of the MEC enhanced network based on changing service usage patterns in accordance with some embodiments presented herein.
Figure 2B:
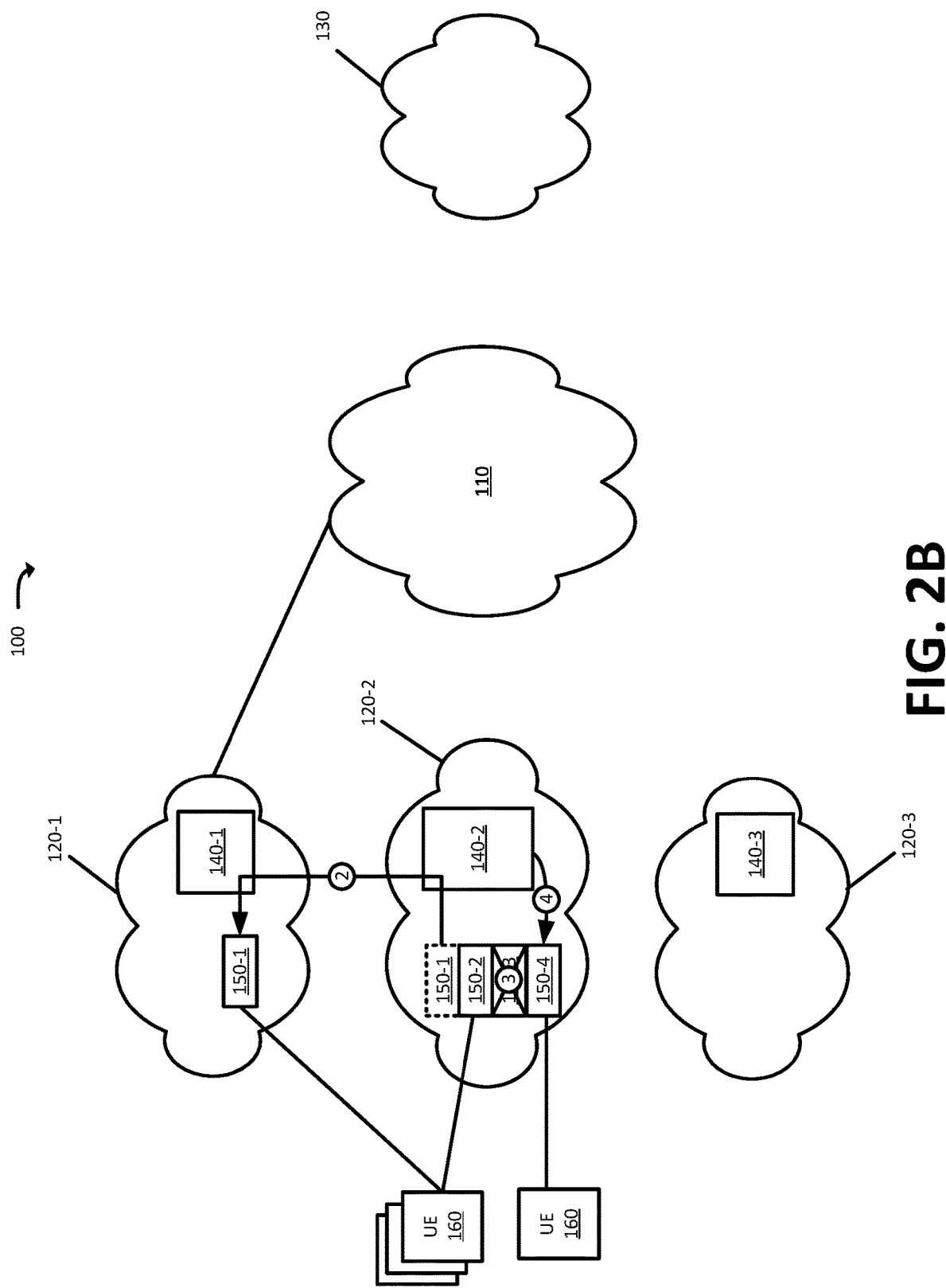

FIGS. 2A and 2B illustrate an example of the dynamic service allocation at different edge locations 120 based on changing service usage patterns in accordance with some embodiments presented herein. As shown in FIG. 2A, MEC controller 140-2 may allocate (at 1) services 150-1, 150-2, and 150-3 to run on resources of edge location 120-2 during a first time based on an expected first service usage pattern.

In some embodiments, MEC controller 140-2 may use artificial intelligence and/or machine learning to derive the first service usage pattern from aggregated public data and network data. For instance, MEC controller 140-2 may categorize service 150-1 as a temporary service that receives a high volume of requests at edge location 120-2 during the first time based on previous request patterns for service 150-1. MEC controller 140-2 may determine that service 150-2 is associated with an event that will begin after the first time based on acquired public data, and may preemptively allocate resources at edge location 120-2 to service 150-2 in anticipation of the coming demand. MEC controller 140-3 may allocate resources for service 150-3 during the first time in response to service 150-3 corresponding to a critical service that is to be performed during the first time based on acquired network data, even though there may be no requests for service 150-3 from UE 160.

FIG. 2A also illustrates one or more UEs 160 requesting service 150-4 and/or accessing service 150-4 from external data network 130. MEC controller 140-2 may determine that service 150-4 is of lower priority than services 150-1, 150-2, and 150-3 during the first time, and may therefore forward requests, that are directed to service 150-4, from edge location 120-2 to external data network 130 via core network 110.

FIG. 2B illustrates an example of MEC controller 140-2 dynamically changing the allocation of services 150 running at edge location 140-2 during a second time, that comes after the first time depicted in FIG. 2A, based on changing service usage patterns and resource availability. As shown in FIG. 2B, MEC controller 140-2 may deallocate (at 2) service 150-1 from edge location 140-1, and may reallocate (at 2) service 150-1 are edge location 140-2 in response to a changing service usage pattern that predicts demand for service 150-1 shifting from edge location 140-2 to edge location 140-1 during the second time. For example, MEC controller 140-2 may determine that demand for service 150-1 originates from a subset of UEs 160, and may track the location of the subset of UEs 160 to predict that requests from the subset of UEs will shift from edge location 140-2 to edge location 140-1 during the second time.

In some embodiments, MEC controller 140-2 may exchange messages with MEC controller 140-1 to determine if edge location 140-1 has sufficient resources to run service 150-1 before allocating service 150-1 to the resources at edge location 140-1. In some embodiments, MEC controller 140-1 may predict the increased priority for running service 150-1 from edge location 120-1, and may independently allocate resources from edge location 120-1 to run service 150-1.

MEC controller 140-2 may continue providing service 150-2 from edge location 120-2 when the event associated with service 150-2 is ongoing through the second time. For instance, MEC controller 140-2 may aggregate public data that indicates an end time that is after the second time, and/or network data that identifies usage of service 150-2 at edge location 120-2 during the second time.

MEC controller 140-2 may deallocate (at 3) service 150-3 from edge location 120-2 (e.g., remove an instance of service 150-3 that runs on resources of edge location 120-2) in response to the tasks associated with service 150-3 being completed during the first time. MEC controller 140-2 may use the resources, that were previously allocated to service 150-3, to run (at 4) service 150-4 from edge location 120-2. In particular, MEC controller 140-2 may determine that demand for service 150-4 at edge location 120-2 increased during the first time, causing the priority of service 150-4 to increase past the priority of other services 150 that may be requested from edge location 120-2.

Figure 3:
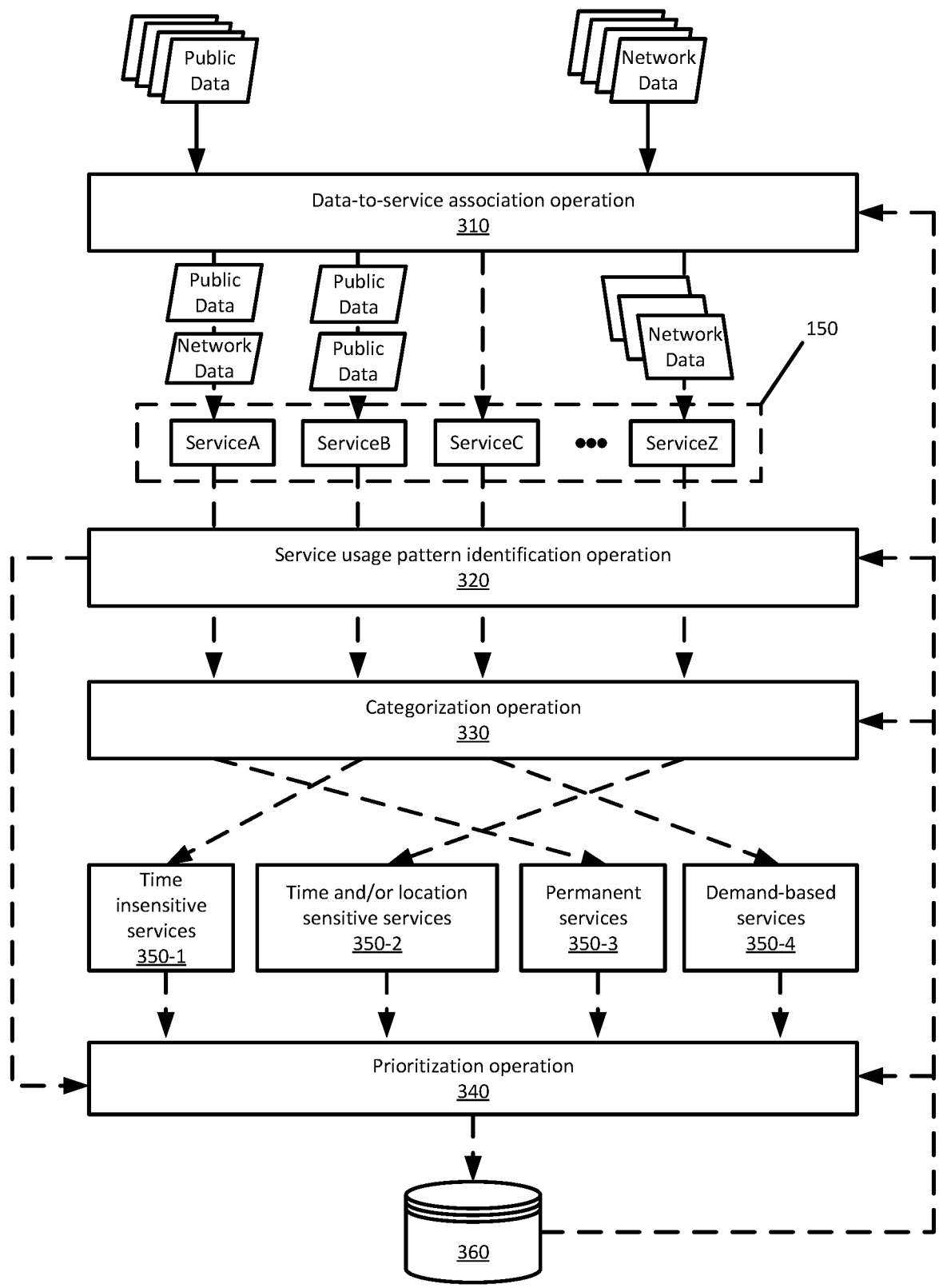
FIG. 3 illustrates an example of using artificial intelligence and/or machine learning to coordinate the dynamic allocation of services to different edge locations at different times in accordance with some embodiments presented herein.

FIG. 3 illustrates an example of using artificial intelligence and/or machine learning to coordinate the dynamic allocation of services 150 to different edge locations 120 at different times in accordance with some embodiments presented herein. FIG. 3 illustrates example operations 310, 320, 330, and 340 of the artificial intelligence and/or machine learning used by MEC controllers 140 to coordinate the dynamic allocation of services 150.

Data-to-service association operation 310 may include collecting public data and/or the network data. In some embodiments, data-to-service association operation 310 may continually or periodically acquire the data from third-party sources and core network 110.

Data-to-service association operation 310 may include associating the collected data to services 150 based on direct, contextual, temporal, and/or geographical relevance. Data with direct relevance to a particular service 150 may include prior requests for that particular service 150. Contextual, temporal, and/or geographical relevance may be derived from the data with the direct relevance. For instance, temporal and geographical relevance may be derived when a large volume of requests are received for a particular service 150 at a particular edge location 120 (e.g., geographical relevance) during a specific time of day (e.g., temporal relevance). Contextual relevance may be derived from identifiers (e.g., Uniform Resource Locators ("URLs")), metadata, textual references, graphics, symbols, images, sounds, and/or other data elements that reference the subject, service provider, and/or other attributes of a particular service 150. Temporal relevance may be established when certain data is collected, and when certain services 150 are run. Temporal relevance may also be established from the data values. For instance, public data may specify a start and/or an end time for an event that is associated with a particular service 150. Geographical relevance may be established based on the location of the data sources (e.g., UEs 160), event locations, network addresses, points of data origination, and/or the data values.

Service usage pattern identification operation 320 may include analyzing the data that is associated with services 150 in order to determine usage patterns for services 150 at different times and/or at different edge locations 120. The usage patterns may identify past usage of a service 150 at different edge locations 120 at different times, based on which future usage may be predicted. The usage patterns may provide additional information. For instance, a particular usage pattern may identify a pattern or correspondence between demand for a particular service 150 at a particular edge location 120 during a period of time, and one or more of a particular set of UEs 160, movement patterns of UEs 160, events, news, network conditions, tracked network metrics, and/or other triggers found within the public data and/or network data. More specifically, a usage pattern may indicate that requests for a particular service 150 increase at a particular edge location 120 at specific times (e.g., during business hours), when specific UEs 160 (e.g., specific types of devices, subscribers, executing applications on UEs 160, etc.) issue requests to the particular edge location 120, when specific keywords are trending on the Internet, when specific traffic patterns are detected in the network (e.g., specific types of HyperText Transfer Protocol ("HTTP") messages), when specific domain names are identified in a threshold number of requests, when other content or services are requested by a threshold number of UEs 160, when vehicular traffic increases on nearby roads, when new content or software is released, and/or when utilization for a specific resource (e.g., processor, memory, network bandwidth, etc.) at the particular edge location 120 exceeds a threshold. In some embodiments, a usage pattern may track interactions with a service 150 that is accessed via an Application Programming Interface ("API"). For instance, a usage pattern may be derived from calls, messages, and/or exchanges conducted with a JavaScript Object Notation ("JSON"), Simple Object Access Protocol ("SOAP"), Representational State Transfer ("REST"), and/or other APIs.

Categorization operation 330 may include categorizing services 150 based on the service usage patterns. Each category may be associated with a different usage pattern. FIG. 3 illustrates four example service categories 350-1, 350-2, 350-3, and 350-4. The artificial intelligence and/or machine learning can generate more or less categories. In some embodiments, categorization operation 330 may be based on a clustering technique or other suitable machine learning technique. For instance, categorization operation 330 may identify a particular category for a particular service 150 based on data and/or usage patterns of the particular service 150 matching to data and/or usage patterns of other services 150 from the particular category. In some embodiments, each category 350 may be defined with a different set of data and/or usage patterns that can be compared against the data and/or usage patterns of different services 150 in order to identify the category 350 that most closely represents each service 150.

In some embodiments, first category 350-1 may include time insensitive services that may be allocated to run at edge locations 120 during periods of low demand and/or when certain resources at an edge location 120 are unused. Time insensitive services may include backups, data collection, IoT services, and/or other activity that may occur infrequently (e.g., daily, weekly, or monthly), that is not time sensitive (e.g., time insensitive), and/or that can occur independent of other services 150. In some embodiments, time insensitive services may include services 150 that have repeating request patterns, include a set of low priority devices (e.g., sensors, backup nodes, etc.), occur during off-hours (e.g., times of low demand), use time insensitive messaging protocols, and/or access low priority or low volume domain names.

In some embodiments, second category 350-2 may include time and/or location sensitive services. For instance, execution of a time and/or location sensitive service may be linked to where and when a particular event takes place. A fantasy football scoring service is an example of a time sensitive service of second category 350-2. The fantasy football scoring service may be allocated to run when the games are being played, and may provide real-time score updates to UEs 160 accessing the fantasy football scoring service. Similarly, a livestream is an example of a time and location sensitive service that may be provided from specific edge locations 120 where the streamed event is permitted to be viewed (e.g., not blacked out) or expected to be in demand, and may be utilized when the streamed event is live.

In some embodiments, third category 350-3 may include permanent services that are continually run, or that require execution from edge locations 120 to provide extremely low latency responsiveness. For instance, autonomous driving services may be categorized to third category 350-3 because the autonomous driving services may require extremely low latency responsiveness (e.g., as compared to responsiveness provided by core network 110 or external data network 130). Accordingly, autonomous driving services (e.g., services categorized to third category 350-3) may be permanently allocated to edge locations 120 where the autonomous driving services can be accessed. As another example, medical services (e.g., remote surgery) may be categorized to third category 350-3 due to an extremely low latency requirement that may only be satisfied via execution from edge locations 120. Accordingly, medical services may be permanently run from one or more edge locations 120.

In some embodiments, fourth category 350-4 may include services that are run based on demand. The demand for a particular service 150 may be determined from a number or rate of requests for that particular service 150. The demand may also be based on other factors including the service type, requesting device type, time of day, service originator, cost for running the particular service 150 at one or more edge locations 120, etc. In some embodiments, when the demand for the particular service 150 reaches a threshold, the particular service may be executed from one or more edge locations 120 where the demand originates, rather than from core network 110 or external data network 130.

Prioritization operation 340 may assign different priorities to different services 150 based on the assigned categories 350 and the changing service usage pattern identified for those services 150. For instance, a first service that is categorized as a permanent service (e.g., third category 350-3) may be assigned a maximum priority by prioritization operation 340 to ensure that the first service is continuously executed from the corresponding edge location 120, and a second service that is categorized as a demand-based service (e.g., fourth category 350-4) may be assigned different priorities by prioritization operation 340 to match demand for the second service that is expected to change according to the service usage pattern identified for the second service.

The results of operations 310-340 may be entered in data store 360, and may be used by MEC controllers 140 to learn and adapt the categorization and prioritization of services 150 as the data and/or usage patterns change. In some embodiments, data store 360 may store the data that was associated to services 150, derived usage patterns for services 150, the categorization of services 150, and/or previously assigned priorities to services 150. Data store 360 may provide the stored results back to one or more of operations 310-340, and operations 310-340 may use the results as inputs for future results. Accordingly, operations 310-340 may use machine learning in order to expand on and improve result accuracy.

In some embodiments, data-to-service association operation 310 may use previous associations of data to services 150 to improve the accuracy with which previously encountered data and new data is associated with existing and new services 150. Similarly, service usage pattern identification operation 320 may use previous usage patterns from data store 360 to improve usage pattern accuracy for existing services and to improve usage pattern derivation for new services. For instance, service usage pattern identifier operation 320 may receive, from data store 360, a usage pattern for a first service that is based on a particular set of data, may determine that the particular set data is associated with a second service, and may derive a usage pattern for the second pattern that is similar to the first pattern based on the similar data associated with the two different services. Categorization operation 330 may improve the accuracy with which existing and new services 150, that have specific usage patterns and data associations, are categorized to categories 350 based on the accuracy of the prior categorizations and commonality in usage patterns and data associations. Prioritization operation 340 may similarly improve the accuracy for predicting service 150 utilization and resource allocation by adapting future prioritizations based on past utilization of services 150 that were categorized to specific categories 350, that had certain usage patterns, and/or that had matching data associations.

In some embodiments, operations 310-340 may be performed by each MEC controller 140 at each edge location 120. Each MEC controller 140 may use the priorities that are assigned to services 150 at a particular point in time to control which services 150 are allocated to and/or run from resources at a corresponding edge location 120 at that particular point in time.

As illustrated in FIG. 3, the allocation of each service may be dependent on different factors (e.g., different categorizations, service usage pattern, available public data, available network data, etc.) at different times. For instance, MEC controller 140 may allocate time insensitive services (e.g., services of first category 350-1) to run at a particular time of day or when resource utilization at an edge location 120 is low, may allocate the time and/or location sensitive services (e.g., services of second category 350-2) to run at different times of day or at edge locations 120 when and where those services are required, may allocate the permanent services (e.g., services of third category 350-3) to run continuously using a partitioned subset of the set of resources available at an edge location 120, and may allocate the demand-based services (e.g., services of fourth category 350-4) to run in response to changing service demand.

The allocation performed by each MEC controller 140 at each edge location 120 may be different due to the varying contextual, temporal, and/or geographical relevance of the data for each edge location 120, and/or due to different priorities that may be assigned to the same services 150 at different edge locations 120. Accordingly, different edge locations 120 may be allocated with and/or run different services 150 at the same time. Moreover, each MEC controller 140 can allocate a different amount of resources to a running service based on service priority and/or other factors. For instance, a particular service running at first edge location 120-1 may have a lower priority than the particular service running at second edge location 120-2. Accordingly, MEC controller 140-1 for first edge location 120-1 may allocate fewer processor, memory, network, and/or other resources to execute the particular service at first edge location 120-1, and MEC controller 140-2 for second edge location 120-2 may allocate more processor, memory, network, and/or other resources to execute the particular service at second edge location 120-2. The different resource allocation may allow the particular service running at second edge location 120-2 to respond to a greater volume of requests and/or UEs 160 than the particular service running at first edge location 120-1.

Throughout the allocation and execution of services 150, MEC controller 140 may track the availability and usage of the set of resources at the edge location 120 under control of that MEC controller 140. The set of resources at each edge location 120 may be finite. Accordingly, MEC controller 140 may be limited in the number of services 150 that it can simultaneously allocate and/or run from the set of resources of a corresponding edge location 120.

When there are insufficient resources available to allocate a new service at a particular edge location 120, MEC controller 140, at that particular edge location 120, may use artificial intelligence and/or machine learning to select one or more running services 150 to transfer to a neighboring edge location 120, core network 110, or external data network 130. For instance, MEC controller 140-1 may use machine learning to determine usage patterns of allocated services 150, and to predict, based on the usage patterns, that demand for a particular latency sensitive service will shift from first edge location 120-1 to second edge location 120-2. MEC controller 140-1 may further determine that the performance requirement of a latency sensitive service running from first edge location 120-1 may still be met by running the latency sensitive service from second edge location 120-2. In this case, MEC controller 140-1 may move the latency sensitive service to second edge location 120-2, provided that second edge location 120-2 has sufficient available resources. In some embodiments, MEC controllers 140 may communicate with one another to relay resource availability, service allocation, and/or other information to facilitate inter-edge location 120 service allocation.

Figure 4:
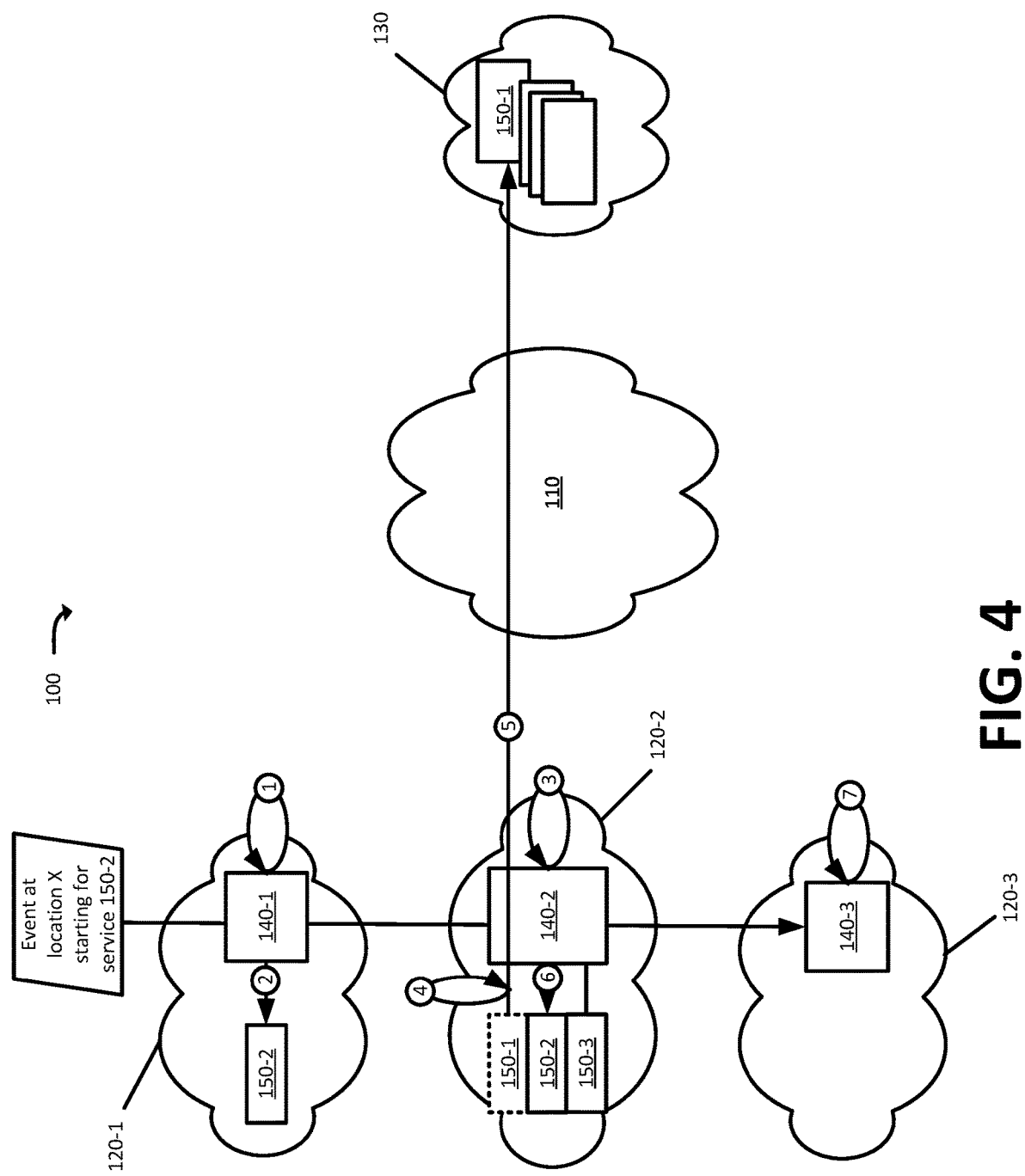
FIG. 4 illustrates an example of the dynamic allocation of services based on a reallocation of a previously running service in accordance with some embodiments presented herein.

FIG. 4 illustrates an example of the dynamic allocation of services based on a reallocation of a previously running service in accordance with some embodiments presented herein. The dynamic allocation may be triggered in response to MEC controllers 140-1, 140-2, and 140-3 acquiring public data about an upcoming event that is associated with service 150-2, and/or network data about UEs 160 that may request service 150-2 (e.g., UEs 160 at or near the event location).

MEC controller 140-1 at first edge location 120-1 may determine (at 1) that the event may significantly increase demand for service 150-2 at first edge location 120-1. Accordingly, MEC controller 140-1 may increase the priority of service 150-2 to coincide with the event start time, and may allocate (at 2) and/or execute service 150-2 using the set of resources at first edge location 120-1.

MEC controller 140-2 at second edge location 120-2 may similarly determine (at 3) that the event may significantly increase demand for service 150-2 at second edge location 120-2. MEC controller 140-2 may further determine (at 3) that there are insufficient resources available to run service 150-2 due to services 150-1 and 150-3 being already allocated to and/or running from the set of resources at edge location 120-2. Accordingly, MEC controller 140-2 may reallocate services 150 at edge location 120 based on changing service priorities.

MEC controller 140-2 may have categorized service 150-1 as a demand-based service, and may have categorized service 150-3 as a permanent or critical service. Accordingly, MEC controller 140-2 may select service 150-1 as a candidate service to be moved out of edge location 120-2, and/or reallocated to another edge location 120, core network 110, or external data network 130.

MEC controller 140-2 may determine (at 4) that demand for service 150-1 is less than expected demand for service 150-2 based on associated public data and/or network data, derived service usage patterns, and/or service categorization. Demand for service 150-1 may be based on the number or rate of requests received for service 150-1 at edge location 120-2, and expected demand for service 150-2 may be based on the event size (e.g., number of tickets sold or venue capacity), Internet traffic directed to the event (e.g., trending topics or keywords associated with the event), number of UEs 160 at or moving towards the event, and/or statistical indicators that may be derived from the acquired public data and/or network data.

MEC controller 140-2 may also determine (at 4) that demand for service 150-1 is less than a threshold defined for executing demand-based services 150 from edge locations 120. Accordingly, MEC controller 140-2 may lower the priority for service 150-1 based on current demand. MEC controller 140-2 may then deallocate service 150-1 from the set of resources at edge location 120-2, and may forward (at 5) future requests for service 150-1 to core network 110 or external data network 130 where service 150-1 may be alternatively accessed, albeit with greater latency than when accessing service 150-2 from edge locations 120. MEC controller 140-2 may allocate (at 6) service 150-2 to edge location 150-2 using the resources that were previously allocated to service 150-1.

MEC controller 140-3 at third edge location 120-3 may also acquire the data associated with service 150-2. MEC controller 140-3 may determine, based on the acquired data, that the event associated with service 150-2 does not significantly increase demand for service 150-2 at third edge location 120-3. In other words, the acquired data may have little or no contextual or geographic relevance for third edge location 120-3. Accordingly, MEC controller 140-3 may preserve (at 7) the resources at third edge location 120-3 for other services 150, and may allow UEs 160, that issue requests for service 150-2 via third edge location 120-3, to access service 150-2 from external data network 130.

Figure 5:
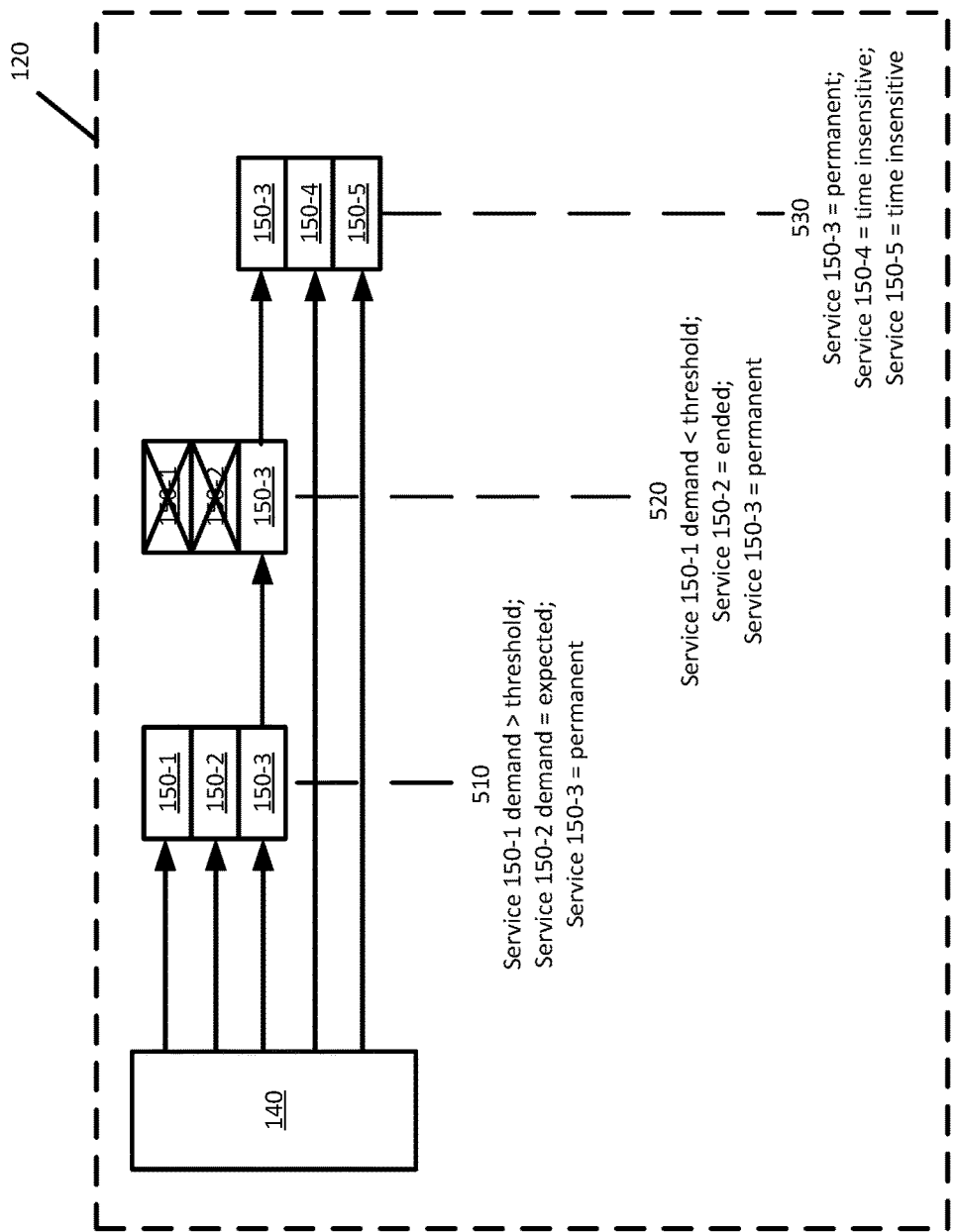
FIG. 5 illustrates an example of dynamically reallocating services to execute time insensitive services at a non-critical time in accordance with some embodiments presented herein.

FIG. 5 illustrates an example of dynamically reallocating services at different times 510, 520, and 530 to execute time insensitive services at non-critical time 530 in accordance with some embodiments presented herein. FIG. 5 illustrates MEC controller 140 allocating and/or running services 150-1, 150-2, and 150-3 from resources of a particular edge location 120 at first time 510.

MEC controller 140 may categorize service 150-1 as a demand-based service based on data associated with service 150-1 and/or a usage pattern of service 150-1. Based on the categorization, MEC controller 140 may continue monitoring demand for service 150-1 over time. Between first time 510 and second time 520, MEC controller 140 may determine that demand for service 150-1 no longer meets a threshold for execution of service 150-1 at the particular edge location 120. MEC controller 140 may monitor incoming requests for service 150-1 to identify the reduced demand. MEC controller 140 may remove service 150-1 from the particular edge location 120 at second time 520 due to the reduced demand for the demand-based service.

MEC controller 140 may categorize service 150-2 as a time sensitive service based on data associated with service 150-2 and/or a usage pattern of service 150-2. MEC controller 140 may determine that service 150-2 or an event associated with service 150-2 ends at second time 520 based on public data and/or network data that MEC controller 140 obtains for service 150-2 or the event associated with service 150-2. In response to service 150-2 or the associated event ending at second time 520, MEC controller 140 may remove service 150-2 from the particular edge location 120 at the second time.

MEC controller 140 may categorize service 150-3 as a permanent service based on data associated with service 150-3 and/or a usage pattern of service 150-3. Based on the categorization, MEC controller 140 may retain the allocation of service 150-3 to resources of the particular edge location 120, and may allow continuous execution of service 150-3 on resources of the particular edge location 120.

As a result of removing services 150-1 and 150-3, resource utilization at the particular edge location 120 may be less than a specified usage threshold at third time 530. Consequently, MEC controller 140 may allocate and/or execute time insensitive services using resources of the particular edge location 120 during third time 530.

Alternatively, or additionally, MEC controller 140 may determine that third time 530 corresponds to a non-critical time window (e.g., between midnight and 5 AM). MEC controller 140 may use artificial intelligence and/or machine learning to identify the non-critical time window based on past usage patterns. For instance, MEC controller 140 may track the total number of requests and/or the total number of connected UEs 160 that access or that issue requests to the particular edge location 120 over multiple days, and may define the non-critical time window based on the tracked totals.

MEC controller 140 may categorize services 150-4 and 150-5 as time insensitive services based on data associated with these services 150-4 and 150-5 and/or analysis of past usage patterns of services 150-4 and 150-5. For instance, time insensitive services 150-4 and 150-5 may include IoT data collection that can occur periodically (e.g., daily, weekly, or monthly) but at any time of day, device upgrades that may occur at times least likely to interfere with user operation (e.g., times when the user is least likely to interact with the device), internal services defined by distributed platform 100 (e.g., backups, service restarts, configuration updates, etc.), and/or other services that are of lower priority relative to the other categories of services 150 (e.g., permanent services, time and/or latency services, demand-based services). MEC controller 140 may then allocate and/or run services 150-4 and 150-5, that are categorized to be time insensitive services, during third time 530 that is determined to be a non-critical time window or a window of low resource utilization.

Figure 6:
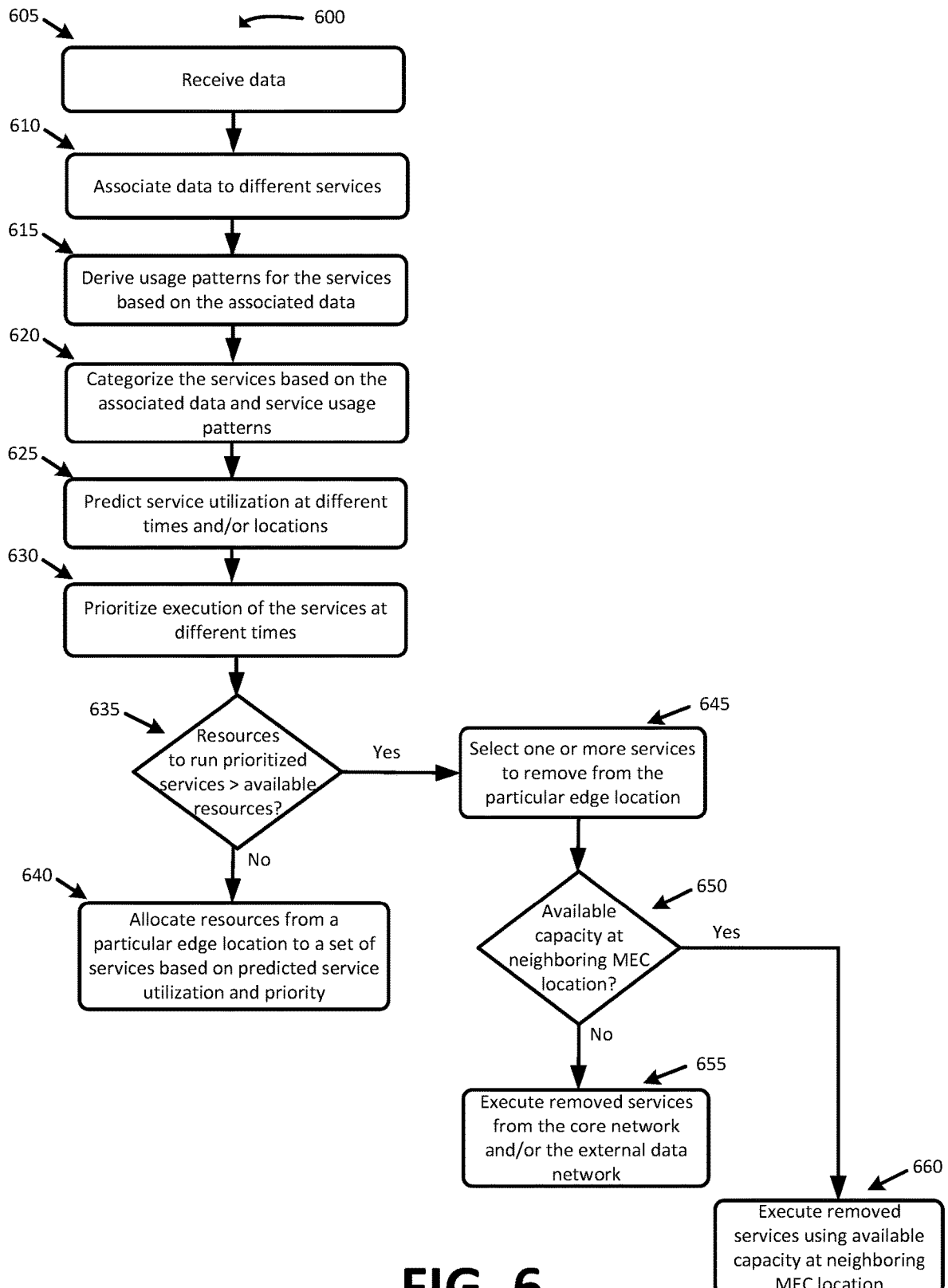
FIG. 6 presents a process for dynamically allocating, moving, and/or managing services at network edge locations based on changing service usage patterns that may be derived by artificial intelligence and/or machine learning in accordance with some embodiments presented herein.

FIG. 6 presents a process 600 for dynamically allocating, moving, and/or managing services 150 at network edge locations 120 based on changing service usage patterns that may be derived by artificial intelligence and/or machine learning in accordance with some embodiments presented herein. Process 600 may be implemented by MEC controllers 140 at one or more edge locations 120 of environment 100.

Process 600 may include receiving (at 605) data. The data may include public data that is obtained from third-party sources external to core network 110 and edge locations 120. For instance, the public data may be acquired from crawling or otherwise searching Internet sites for information about venues, topics, locations, events, and/or activities that may have contextual, temporal, or geographical relevance to services 150. The data may, additionally or alternatively, include network data that is obtained from core network 110. The network data may correspond to metrics for service 150 utilization across edge locations 120, UE 160 connectivity, UE 160 location, UE 160 access behavior, UE 160 profiles, service 150 profiles, and/or other information that core network 110 may collect on UEs 160 and/or services 150. MEC controllers 140 may directly obtain the network data from UE requests that are issued to edge locations 120. MEC controllers 140 may also obtain the network data from MME, HSS, gateways, and/or other elements of core network 110.

Process 600 may include using artificial intelligence and/or machine learning to associate (at 610) the received (at 605) data to different services 150 based on contextual, temporal, or geographic relevance between the data and the associated services 150. For example, a first set of data may provide information about an event that is associated with a first service 150, and a second set of data may provide information about UEs 160 that previously requested a second service 150 or that access services 150 via a particular edge location 120.

Process 600 may include deriving (at 615) usage patterns for different services 150 based on the data that is associated to those services 150, categorizing (at 620) services 150 based on the associated data and the usage patterns, and predicting (at 625) service utilization at different times and/or edge locations 120 based on the usage patterns and/or the service categorization. In some embodiments, deriving (at 615) a usage pattern for a particular service 150 may include using artificial intelligence and/or machine learning to determine at least one correlation between (i) the times at which demand for the particular service peaked and (ii) the times, events, UE movements, and/or other contextual, temporal, and/or geographical relevance within the public and/or network data associated with the particular service. Deriving (at 615) the usage pattern may further include generating a model to represent the correlation between the demand or changes in the usage pattern and the data. In some embodiments, predicting (at 625) future utilization of the particular service may include using artificial intelligence and/or machine learning to determine, based on historical analysis of the associated data, a pattern at which the correlated data for the demand recurs or is expected to recur, and to modify the model with a probabilistic distribution of future demand based on the expected recurrence of the data correlated to the demand or significance of the data to the demand. For instance, MEC controller 140 may predict (at 625) specific times for executing a first service at a particular edge location 120 as a result of categorizing (at 620) the first service as a time and/or latency sensitive service based on a first service usage pattern, that is derived (at 615) from the data that is associated with the first service, specifying times and locations at which an associated event commences and ends. Similarly, MEC controller 140 may predict (at 625) specific times for executing a second service at the particular edge location 120 as a result of categorizing (at 620) the second service as a demand-based service based on a second service usage pattern, that is derived (at 615) from the data that is associated with the demand-based service, identifying when a subset of UEs 160 begin accessing the second service from the particular edge location 120. MEC controller 140 may predict (at 625) continuous execution for a third service that is categorized (at 620) as a permanent service, and may predict (at 625) non-critical times or conditions during which services categorized (at 620) as time insensitive services may execute.

Process 600 may include prioritizing (at 630) execution of services 150 at the different times based on the predicted (at 625) service utilization. In some embodiments, the prioritization (at 630) may include identifying some services 150 as low priority services to run from core network 110 or external data network 130, and other services 150 as high priority services to run from one or more edge locations 120 for different periods of time. The prioritization (at 630) may also include adjusting the priority of services 150 that have already been allocated to and are running from one or more edge locations 120 at different times based on changing utilization and/or other conditions.

Process 600 may include determining (at 635) whether a particular edge location 120 has sufficient free resources to run a prioritized set of services 150 defined for that particular edge location 120 at the current time based on the predicted service utilization and service priority. For instance, MEC controller 140 may track one or more services 150 that were previously allocated to resources at the particular edge location 120 and/or any unused resources at the particular edge location 120. MEC controller 140 may further determine whether the unused resources are sufficient to run a current set of prioritized services 150 at particular edge location 120 or whether one or more of the previously allocated services 150 have to be removed and/or reallocated to another edge location 120, to core network 110, or to external data network 130.

In response to determining (at 635—No) that the resources required to run the current set of prioritized services 150 are less than the resources that are available at the particular edge location 120, process 600 may include allocating (at 640) resources from the particular edge location 120 to run the prioritized set of services 150. The resource allocation (at 640) may include retrieving executable instances of the prioritized set of services 150 from core network 110 and/or external data network 130. For instance, service providers may upload services 150 to a repository within core network 110, and MEC controllers 140 at different edge locations 120 may identify and retrieve different services 150 from the repository at the different times when those services 150 have priority to run from resources of those edge locations 120. In some embodiments, MEC controllers 140 at different edge locations 120 may identify and retrieve different services 150 directly from devices that are operated by the respective service providers in external data network 130. The resource allocation (at 640) may further include configuring some subset of processor, memory, network, and/or other resources for execution of a different service 150, wherein the configuration may provide each service 150 exclusive or shared access to a subset of resources.

In response to determining (at 635—Yes) that the resources required to run the current set of prioritized services 150 are greater than the resources that are available at the particular edge location 120, process 600 may include selecting (at 645) one or more previously allocated services 150 to remove from the particular edge location 120, wherein the removal of the one or more services 150 would free enough resources to allow for execution of the current set of prioritized services 150 from the particular edge location 120. The selection (at 645) may include identifying the one or more services 150 with priorities that are less than the priorities of the current set of prioritized services 150. For instance, as time passes or demand changes, one or more of the allocated services 150 may lose priority due to lower utilization. The one or more services 150 may become candidates for removal from the particular edge location 120.

Process 600 may determine (at 650) if there is available capacity at a neighboring edge location 120 to run the one or more services 150 that were selected (at 645) for removal from the particular edge location 120. In some embodiments, the one or more services 150 being removed from the particular edge location 120 may have a lower priority and/or lower expected utilization than the current set of prioritized set of services 150, but the one or more services 150 may still have sufficient priority or expected utilization for improved performance relative to other lower priority services 150 executing from core network 110 and/or external data network 130. The determination (at 650) for available capacity at the neighboring edge locations 120 may include MEC controller 140 at the particular edge location 120 and the neighboring edge locations 120 exchanging messaging that identifies available capacity at each edge location 120.

In response to determining (at 650—No) that there is insufficient capacity at the neighboring edge locations 120 to run the one or more services 150 being removed from the particular edge location 120, process 600 may include executing (at 655) the one or more services 150 using resources in core network 110 and/or external data network 130. In some embodiments, MEC controller 140 may issue commands to instantiate and/or run the one or more services 150 at core network 110 and/or external data network 130. In some other embodiments, MEC controller 140 may receive requests that are directed to the one or more services 150. MEC controller 140 may determine that the one or more services 150 are not running at the particular edge location 120, and may forward the requests to core network 110 or to external data network 130 via core network 110 where resources configured with the one or more services 150 can respond to the requests.

In response to determining (at 650—Yes) that there is sufficient capacity at a neighboring edge location 120 to run the one or more services 150, process 600 may include allocating (at 660) the one or more services 150 to run using the resources of the neighboring edge location 120. In some embodiments, MEC controller 140 may be selective in which services 150 are run from a neighboring edge location 120. For instance, MEC controller 140 may run a subset of the removed services 150 from a neighboring edge location 120 when the subset of removed services has a priority that specifies continued execution of the services from edge locations 120 if possible.

MEC controller 140 may track which services 150 are moved and run from a neighboring edge location 120, and may further track the network address of the neighboring edge location 120. Accordingly, when MEC controller 140 receives a request for a service that is moved to a neighboring edge location 120, MEC controller 140 may forward that request to the neighboring edge location 120, rather than core network 110, where resources of the neighboring edge location 120 may be used to respond to the request.

In some embodiments, MEC controller 140 may track resource utilization by each allocated service 150. MEC controller 140 may track resource utilization for billing, load management, and/or other purposes. In some embodiments, MEC controller 140 may generate alerts when the resource utilization for a particular service deviates from a Service Level Agreement ("SLA") that is established with the particular service provider. MEC controller 140 may issue the alerts to the particular service provider, or may issue the alerts to components of core network 110.

In some embodiments, the artificial intelligence and/or machine learning may modify the usage patterns, models, usage probabilities, and/or assigned priorities based on whether the associated data and/or other contributing factors positively or negatively affected their derivation. For instance, the artificial intelligence and/or machine learning may determine that a first subset of data (e.g., an event, a location, UE movements, etc.) associated to a particular service 150 negatively affected the usage pattern and/or model for that particular service by causing an early or late allocation of the particular service 150 to an edge location 120. Accordingly, the artificial intelligence and/or machine learning may modify the usage pattern and/or model for the particular service 150 to exclude the first subset of data from a next derivation, and thereby improve the effectiveness of future allocations of the particular service 150.

In some embodiments, the usage pattern, model, usage probabilities, and/or assigned priority for a particular service 150 may be refined based on whether the utilization of the particular service 150 after an allocation satisfies requirements of an SLA or other contractual agreements with the service provider. For instance, MEC controller 140 may determine whether the allocation of the particular service 150 resulted in a desired quality of service and/or performance, and may refine one or more of the usage pattern, model, usage probabilities, and/or assigned priority for the particular service 150 to better conform with the desired quality of service and/or performance.

In any case, MEC controller 140, via the artificial intelligence and/or machine learning, may analyze each factor contributing to the derivation of the usage patterns, models, usage probabilities, and/or assigned priorities, and may refine the usage and/or weight of each factor to continually improve the service allocation and performance at each edge location 120. By continually refining the usage patterns, models, usage probabilities, and/or assigned priorities, MEC controller 140 may change the frequency, time, and duration with which the same set of services 150 are allocated to edge locations 120, core network 110, and/or external data network 130.

Figure 7:
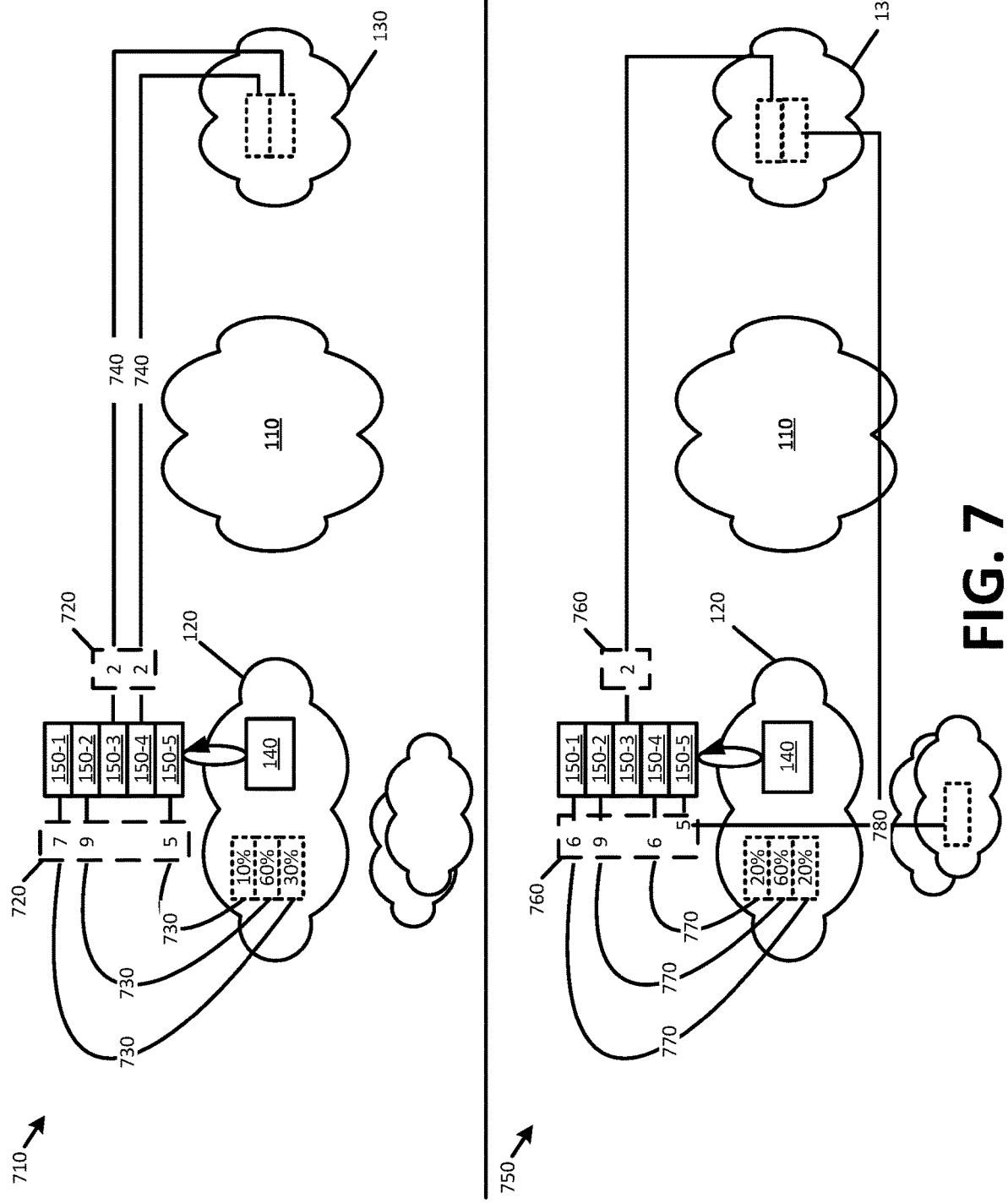
FIG. 7 illustrates an example of the MEC controller controlling the allocation of services based on changing service priority in accordance with some embodiments presented herein.

FIG. 7 illustrates an example of MEC controller 140 controlling the allocation of services 150 based on changing service priority in accordance with some embodiments presented herein. Prior to first time 710, MEC controller 140 may assign (at 720) a priority to each of a set of available services 150 based on one or more of the usage patterns, service categorization, and predicted utilization during first time 710. Services 150-1, 150-2, and 150-5 may be assigned a priority that is greater than a threshold for edge location execution of the services, whereas services 150-3 and 150-4 may be assigned a priority that is less than the threshold.

During first time 710, MEC controller 140 may allocate (at 730) resources of edge location 120 to services 150-1, 150-2, and 150-5, and may provide (at 740) access to services 150-3 and 150-4 via a public cloud or external core network 130. The amount of resources from edge location 120 that MEC controller 140 allocates (at 730) to services 150-1, 150-2, and 150-5 may vary according to the assigned priority. For instance, service 150-2 may have the greatest priority due to the predicted utilization of service 150-2 being greater than the predicted utilization of other services during first time 710. Accordingly, MEC controller 140 may allocate (at 730) a greater percentage of compute, memory, network, and/or other edge location 120 resources to service 150-2 than services 150-1 and 150-3.

Prior to second time 750, MEC controller 140 may change (at 760) the service priorities as the usage patterns, categorization, and/or predicted utilization change over time. As shown in FIG. 7, MEC controller 140 may increase the priority of service 150-4 and may decrease the priority of service 150-1 prior to the start of second time 750. The priority of service 150-4 may increase past the threshold for edge location execution, may be greater than the priority assigned to service 150-5, and may be equal to the changed priority of service 150-1. The resources at edge location 120 may be limited to execution of three services. Accordingly, MEC controller 140 may halt execution of service 150-5 and may remove service 150-5 from edge location 120. MEC controller 140 may then dynamically reallocate (at 770) resources of edge location to services 150-1, 150-2, and 150-4 based on the changed priorities of services 150-1, 150-2, and 150-4 at the second time. For instance, in response to services 150-1 and 150-4 having the same priority at the second time, MEC controller 140 may change the amount of resources that were allocated to service 150-1 during first time 710 so that services 150-1 and 150-4 receive an equal allocation of resources during second time 750.

During second time 740, the priority of service 150-5 may remain greater than the threshold although it is less than services 150-1, 150-2 and 150-4 that are allocated to run from edge location 120. Accordingly, MEC controller 140 may execute (at 780) service 150-5 from a neighboring edge location if there are sufficient available resources at the neighboring edge location, or may provide access to service 150-5 via the public cloud or external core network 130 if there are insufficient resources available at the neighboring edge locations.

Figure 8:
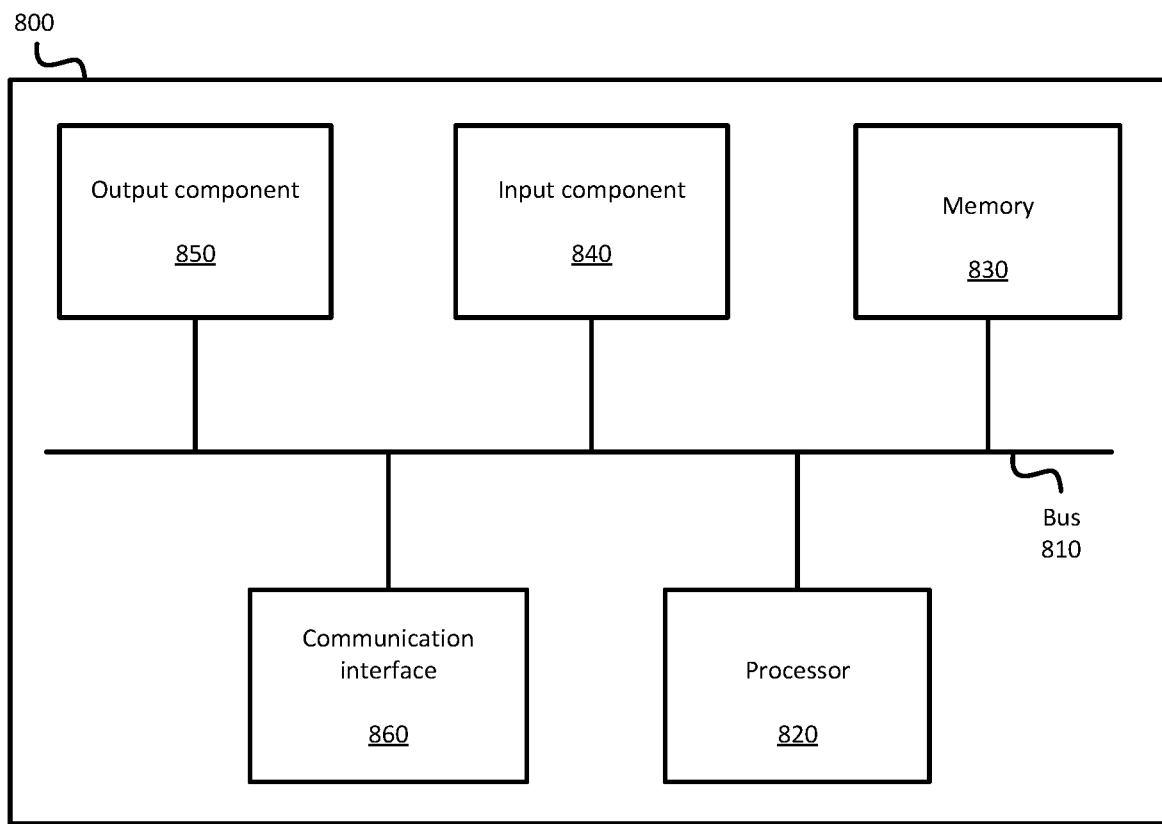
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 2A, 2B, 3, 4, and 6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   derive a plurality of models based on usage patterns of a plurality of services;
   identify a time at which a particular event is scheduled to begin;
   identify a geographical location of the particular event;
   determine, based on the geographical location of the particular event, that the particular event has geographical relevance to a particular set of edge resources out of a plurality of sets of edge resources that are each associated with different geographical locations;
   identify a first set of services, of the plurality of services, that is associated with the particular event;
   set, at a time corresponding to the time at which the particular event is scheduled to begin, a respective priority level for each particular service, of the first set of services, to a first priority level;
   determine that an amount of available resources of the particular set of edge resources, at the time corresponding to the particular event, is less than a threshold amount of resources associated with the first set of services;
   identify a second set of services, executing at the particular set of edge resources at the time corresponding to the particular event, that is associated with a second priority level that is different from the first priority level;
   deallocate at least a portion of resources, of the particular set of resources, that were previously allocated for the second set of services, based on identifying that the second set of services is associated with the second priority level;
   allocate the portion of resources of the particular set of edge resources, that were previously allocated for the second set of services, to execute the first set of services based on expected usage of the first set of services via the particular set of edge resources as determined from the plurality of models, the expected usage further being based on the determination that the particular event has geographical relevance to the particular set of edge resources;
   monitor usage of the first set of services via the particular set of edge resources after the portion of resources of the particular set of edge resources have been allocated to execute the first set of services;
   determine, based on the monitoring, that the monitored usage of the first set of services via the particular set of edge resources deviates from the expected usage of the first set of services;
   modify the priority level associated with the first set of services from the first priority level to a third priority level, based on the deviation of the monitored usage of the first set of services from the expected usage of the first set of services;
   allocate additional resources of the particular set of edge resources to execute the first set of services based on the modification to the priority level associated with the first set of services.

2. The device of claim 1,
   wherein the first set of services correspond to a first category associated with permanent services;
   wherein the second set of services correspond to a second category associated with non-time insensitive services; and wherein the one or more processors are further configured to:
schedule services of the first category to execute from the particular set of edge resources at the time at which the particular event is scheduled to begin; and
schedule services of the second category to execute from the particular set of edge resources after the particular event is scheduled to end.

3. The device of claim 1,
wherein the expected usage of the first set of services includes increased utilization via the particular set of edge resources during a first time period corresponding to the time at which the particular event is scheduled to begin and decreased utilization via the particular set of edge resources during a second time period that is subsequent to the first time period; and
wherein the expected usage of the second set of services includes increased utilization via the particular set of edge resources during the second time period and decreased utilization via the particular set of edge resources during the first time period.

4. The device of claim 1, wherein the one or more processors are further configured to:
receive information indicating an end time associated with the particular event,
wherein modifying the priority level of the first set of services is further based on the information indicating the end time associated with the particular event.

5. The device of claim 1,
wherein the first set of services comprises:
one or more services with permissions to execute from the particular set of edge resources during a first time period,
services with expected usage during the first time period, and
services that are associated with events occurring during the first time period; and
wherein the second set of services comprises:
services with permissions to execute from the particular set of edge resources during a second time period,
services with expected usage during the second time period, and
services that are associated with events occurring during the second time period.

6. The device of claim 1, wherein the one or more processors are further configured to:
classify a first service of the plurality of services to a first category based on the usage pattern of the first service being associated with a predicted utilization of the first service from the particular set of edge resources during a first time period;
classify a second service of the plurality of services to a second category based on time insensitive operations associated with the second service;
wherein allocating the portion of resources of the particular set of edge resources to execute the first set of services further comprises:
causing the particular set of edge resources to execute the first service from the particular set of edge resources during the first time period based on services of the first category being allocated to run from the particular set of edge resources during the first time period; and
wherein allocating the resources of the particular set of edge resources to execute the second set of services further comprises:
causing the second service to execute from the particular set of edge resources during a second time period based on the second time period corresponding to a utilization of the resources of the particular set of edge resources.

7. The device of claim 1, wherein allocating the first set of services further comprises:
selecting a third set of services that were previously allocated to the particular set of edge resources based on the third set of services being associated with less expected utilization than the first set of services;
removing the third set of services from the particular set of edge resources; and
allocating resources, that were freed as a result of removing the third set of services, to execute the first set of services.

8. The device of claim 7, wherein the one or more processors are further configured to:
execute the first set of services at the particular set of edge resources in response to a first set of requests that are directed to the first set of services; and
distribute a second set of requests, that are directed to the second set of services and are received while the first set of services are executing at the particular set of edge resources, from the particular set of edge resources to another set of edge resources or an external data network executing the second set of services.

9. The device of claim 1, wherein the one or more processors are further configured to:
determine that a priority level associated with the second set of services is greater than the modified priority level of the first set of services after the resources of the particular set of edge resources have been allocated to execute the first set of services, wherein allocating the resources of the particular set of edge resources to execute the second set of services is performed based on the determining that the priority level associated with the second set of services is greater than the priority level associated with the first set of services.

10. The device of claim 1, wherein determining that the monitored usage of the first set of services via the particular set of edge resources deviates from the expected usage of the first set of services includes determining that the monitored usage of the first set of services via the particular set of edge resources is less than the expected usage of the first set of services.

11. The device of claim 1, wherein the first set of services includes at least one service that is not included in the second set of services.

12. The device of claim 11, wherein the modified priority level associated with the at least one service is lower than respective priority levels of each service included in the second set of services.

13. The device of claim 12, wherein the priority level associated with the at least one service, before the modification, is higher than respective priority levels of each service included in the second set of services.

14. A non-transitory computer-readable medium, storing a plurality of processor-executable instructions, which, when executed by one or more processors, cause the one or more processors to:
derive a plurality of models based on usage patterns of a plurality of services;
identify a time at which a particular event is scheduled to begin;

identify a geographical location of the particular event;
determine, based on the geographical location of the particular event, that the particular event has geographical relevance to a particular set of edge resources out of a plurality of sets of edge resources that are each associated with different geographical locations;
identify a first set of services, of the plurality of services, that is associated with the particular event;
set, at a time corresponding to the time at which the particular event is scheduled to begin, a respective priority level for each particular service, of the first set of services, to a first priority level;
determine that an amount of available resources of the particular set of edge resources, at the time corresponding to the particular event, is less than a threshold amount of resources associated with the first set of services;
identify a second set of services, executing at the particular set of edge resources at the time corresponding to the particular event, that is associated with a second priority level that is different from the first priority level;
deallocate at least a portion of resources, of the particular set of resources, that were previously allocated for the second set of services, based on identifying that the second set of services is associated with the second priority level;
allocate the portion of resources of the particular set of edge resources, that were previously allocated for the second set of services, to execute the first set of services based on expected usage of the first set of services via the particular set of edge resources as determined from the plurality of models, the expected usage further being based on the determination that the particular event has geographical relevance to the particular set of edge resources;
monitor usage of the first set of services via the particular set of edge resources after the portion of resources of the particular set of edge resources have been allocated to execute the first set of services;
determine, based on the monitoring, that the monitored usage of the first set of services via the particular set of edge resources deviates from the expected usage of the first set of services;
modify the priority level associated with the first set of services from the first priority level to a third second priority level, based on the deviation of the monitored usage of the first set of services from the expected usage of the first set of services;
allocate additional resources of the particular set of edge resources to execute the first set of services based on the modification to the priority level associated with the first set of services.

15. The non-transitory computer-readable medium of claim 14,
wherein the first set of services correspond to a first category associated with permanent services;
wherein the second set of services correspond to a second category associated with non-time insensitive services; and
wherein the processor-executable instructions further include processor-executable instructions to:
schedule services of the first category to execute from the particular set of edge resources during a first time period; and
schedule services of the second category to execute from the particular set of edge resources during a second time period that is different from the first time period.

16. The non-transitory computer-readable medium of claim 14,
wherein the expected usage of the first set of services includes increased utilization via the particular set of edge resources during a first time period corresponding to the time at which the particular event is scheduled to begin and decreased utilization via the particular set of edge resources during a second time period that is subsequent to the first time period; and
wherein the expected usage of the second set of services includes increased utilization via the particular set of edge resources during the second time period and decreased utilization via the particular set of edge resources during the first time period.

17. A method, comprising:
deriving a plurality of models based on usage patterns of a plurality of services;
identifying a time at which a particular event is scheduled to begin;
identifying a geographical location of the particular event;
determining, based on the geographical location of the particular event, that the particular event has geographical relevance to a particular set of edge resources out of a plurality of sets of edge resources that are each associated with different geographical locations;
identifying a first set of services, of the plurality of services, that is associated with the particular event;
setting, at a time corresponding to the time at which the particular event is scheduled to begin, a respective priority level for each particular service, of the first set of services, to a first priority level;
determining that an amount of available resources of the particular set of edge resources, at the time corresponding to the particular event, is less than a threshold amount of resources associated with the first set of services;
identifying a second set of services, executing at the particular set of edge resources at the time corresponding to the particular event, that is associated with a second priority level that is different from the first priority level;
deallocating at least a portion of resources, of the particular set of resources, that were previously allocated for the second set of services, based on identifying that the second set of services is associated with the second priority level;
allocating the portion of resources of the particular set of edge resources, that were previously allocated for the second set of services, to execute the first set of services based on expected usage of the first set of services via the particular set of edge resources as determined from the plurality of models, the expected usage further being based on the determination that the particular event has geographical relevance to the particular set of edge resources;
monitoring usage of the first set of services via the particular set of edge resources after the portion of resources of the particular set of edge resources have been allocated to execute the first set of services;
determining, based on the monitoring, that the monitored usage of the first set of services via the particular set of edge resources deviates from the expected usage of the first set of services;

modifying the priority level associated with the first set of services from the first priority level to a third priority level, based on the deviation of the monitored usage of the first set of services from the expected usage of the first set of services;

allocating additional resources of the particular set of edge resources to execute the first set of services based on the modification to the priority level associated with the first set of services.

18. The method of claim 17 further comprising:

determining a relationship between previous instances of the particular event and an increase in utilization of a particular service of the first set of services, wherein the resources of the particular set of edge resources are allocated to execute the first set of services further based on the relationship between the previous instances of the event and the increase in utilization of the particular service of the first set of services.

19. The method of claim 17 further comprising:

receiving a plurality of requests at the particular set of edge resources during a particular time period during which the resources of the particular set of edge resources are allocated to execute the first set of services;

responding to a first set of the plurality of requests that are directed to the first set of services by executing the first set of services from the particular set of edge resources during the particular time period; and providing a different second set of the plurality of requests that are directed to the second set of services to an external network during the particular time period.

\* \* \* \* \*